(12) United States Patent
Noguchi

(10) Patent No.: US 6,631,042 B2
(45) Date of Patent: Oct. 7, 2003

(54) LENS BARREL HAVING IMAGE SHAKE CORRECTING FUNCTION AND OPTICAL DEVICE HAVING SAME

(75) Inventor: Kazuhiro Noguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/824,021

(22) Filed: Apr. 3, 2001

(65) Prior Publication Data

US 2001/0028516 A1 Oct. 11, 2001

(30) Foreign Application Priority Data

Apr. 6, 2000 (JP) ........................................ 2000-104771

(51) Int. Cl.[7] ............................. G02B 7/02; G03B 17/50
(52) U.S. Cl. ........................ 359/823; 359/822; 359/821; 396/55
(58) Field of Search ................................ 359/823, 822, 359/821, 819, 824, 826; 396/55, 90, 349, 448

(56) References Cited

U.S. PATENT DOCUMENTS

| 5,117,246 | A | 5/1992 | Takahashi et al. | 354/202 |
|---|---|---|---|---|
| 5,602,675 | A | 2/1997 | Okada | 359/554 |
| 5,689,369 | A | 11/1997 | Noguchi | 359/557 |
| 5,715,086 | A | 2/1998 | Noguchi et al. | 359/557 |
| 5,932,984 | A | 8/1999 | Murakami et al. | 318/560 |
| 6,064,827 | A | 5/2000 | Toyoda | 396/55 |
| 6,112,028 | A | 8/2000 | Okada | 396/55 |
| 6,295,412 | B1 | * 9/2001 | Katano et al. | 396/55 |

FOREIGN PATENT DOCUMENTS

| JP | 6-289465 | 10/1994 |
|---|---|---|
| JP | 10-109499 | 4/1998 |
| JP | 10-319465 | 12/1998 |
| JP | 11-305277 | 11/1999 |

* cited by examiner

*Primary Examiner*—Georgia Epps
*Assistant Examiner*—Tim J Thompson
(74) *Attorney, Agent, or Firm*—Fitzpatrick, Cella, Harper & Scinto

(57) ABSTRACT

A lens barrel includes a lens movable in a direction orthogonal to the optical axis of the lens barrel, a movable member that holds the lens, a fixed member that regulates movement of the movable member in a direction of the optical axis, at least three balls placed between the movable member and the fixed member, each of the balls being held in a holding portion formed in one of the movable member and the fixed member so as to roll and to allow relative movement between the movable member and the fixed member, an urging member that urges the movable member toward the fixed member, a driving unit that generates force for moving the movable member in two directions orthogonal to the optical axis, and a position detecting mechanism for detecting positions of the movable member in the two directions orthogonal to the optical axis.

32 Claims, 9 Drawing Sheets

LENS BARREL HAVING IMAGE SHAKE CORRECTING FUNCTION AND OPTICAL DEVICE HAVING SAME

BACKGROUND OF THE INVENTION

1. Field of the Invention

The present invention relates to a lens barrel having a shake-correcting function, and an optical device having the same.

2. Description of the Related Art

In order to prevent image blur due to hand shake or the like caused when a camera is held in the hand, various devices have been proposed which perform hand shake correction by detecting information about the shaking of the camera by shake-detecting means and optically or electronically cancelling the hand shake according to the result of the detection. For example, Japanese Patent Application No. 10-109499 and U.S. Pat. No. 6,112,028 corresponding thereto disclose a zoom lens having a so-called shift-type shake-correction means which corrects hand shake by moving one of a plurality of lens units in a plane perpendicular to the optical axis.

In this disclosure, three pins are press-fitted in a barrel for holding a shift lens unit so as to be arranged in the radial direction, and are fitted in three slots formed in a fixed member in the circumferential direction with a certain clearance therebetween, thereby regulating the shift lens unit in a plane perpendicular to the optical axis. Furthermore, a guide section is urged in one direction by a magnetic attracting force acting between a magnet and a ferromagnetic material so as to be prevented from rattling in the optical axis direction. This makes it possible to enhance optical performance and to reduce operating noise resulting from rattling during driving.

Japanese Patent Laid-Open No. 6-289465 and U.S. Pat. No. 5,602,675 corresponding thereto disclose a shake-correcting device in which loads in the optical axis direction and two shift direction are reduced by appropriately designing the shape and layout of extension parts of a flexible printed circuit board for connecting a fixed section and a shifting section, thereby preventing the driving of the shifting section from being adversely affected by the loads.

Japanese Patent Laid-Open No. 10-319465 and U.S. Pat. No. 6,064,827 corresponding thereto disclose a lens shifting device, in which, in order to prevent rattling of a guide section in the optical axis direction and to reduce driving resistance with a simple structure, at least three balls are clamped by springs between a fixed member and a movable member, and the movable member is guided by rolling balls and is prevented by the springs from rotating about the optical axis.

Recent optical devices having a lens barrel have been required to become more compact and to have less protuberances in order to improve portability and ease of mounting. With this, of course, there has been a demand for reducing the size of the lens barrel. If the lens barrel is further reduced in size, however, the space for accommodating a flexible printed circuit board for connecting a fixed section and a movable section is substantially limited, and rigidity of the flexible printed circuit board is increased. As a result, as taught in Japanese Patent Laid-Open No. 6-289465, it is difficult to reduce the force produced in the flexible printed circuit board in the optical axis direction to such a level that the force is not significant by only changing the shape and layout of the extension parts.

Accordingly, there has been a proposal to urge the movable section in the optical axis direction by an appropriate force produced by a magnet or the like, as disclosed in Japanese Patent Application No. 10-109499. However, depending on variations in urging force in the optical axis direction produced in the flexible printed circuit board, the movable section is more strongly pressed against the guide section and friction is significantly increased, or conversely, urging by the magnet or the like is cancelled. This adversely affects the driving of the movable section.

On the other hand, because of advances in semiconductor micromachining technologies, it has been possible to produce CCDs with a smaller pixel pitch which convert an image of a subject formed in the focal plane by an image-capturing optical system into electrical signals. This has led to two trends: further size reduction of the optical system by arranging the same number of pixels as previously in a smaller area, and higher resolution of the optical system achieved by arranging more pixels in the same area and in a larger area. In the former, since the amount of shift of a shift lens unit for correcting hand shake is substantially proportional to the image-capturing area, more precise motion is needed, and the space for accommodating the flexible printed circuit board is reduced. In the latter case, since the resolution is lowered unless a smaller shake can be corrected, it is necessary to reduce frictional force produced in a guide section for the movable section and to thereby achieve more precise motion. In both cases, the required accuracy of tilting of the shift lens unit is increased.

Japanese Patent Laid-Open No. 10-319465 discloses a structure in which at least three balls are clamped between the fixed member and the movable member by the tensile force of the springs, and the movable member is guided by rolling the balls in order to prevent the guide section from rattling in the optical axis direction and to thereby reduce friction. Since the balls are held by a holding member so as not to be displaced from the fixed member, the movable member is guided by rolling the balls. Sliding frictional force is generated between the balls and the fixed member and the holding member due to the rolling of the balls in the holding member, and therefore, the balls are clamped by the smallest possible urging force of the springs which prevents rattling of the balls. For this reason, the movable member is lifted by a slight acceleration in the optical axis direction in which an inertial force greater than the urging force acts on the movable member. Consequently, optical performance is degraded due to tilting of the lens unit, and noise, such as sound generated by the abutting movement of the balls, is produced. For example, when a movable member of 4 g is urged by a force of 4 gf, it is lifted only by an acceleration of 1 G or more.

Since the movable member is prevented from rotating about the optical axis only by the tensile force of the springs, the rotation cannot be prevented completely, but is only restrained. In the above proposal, since the output value from a position detecting means is changed due to the rotation about the optical axis, the movable member may be rotated about the optical axis depending on the positional relationship between the position where the driving means generates force and the center of gravity of the movable member and on the connecting position and shape of the flexible printed circuit board. This makes it impossible to precisely move the shift lens to the correct position for shake correction.

SUMMARY OF THE INVENTION

Accordingly, an object of the present invention is to provide a lens barrel in which load is applied to a movable member during driving only by a force produced by rolling friction of balls, which is considerably smaller than the sliding frictional force, until the balls each contact a limiting end of a limited range, in which a lens unit for shake correction can be precisely driven even when force for urging the movable member in the optical direction is increased, and in which the urging force can be increased to such a degree that the influence of variations in force in the optical axis direction generated in a flexible printed circuit board for connecting the movable member and a fixed member is negligible, thereby preventing rattling more reliably.

Another object of the present invention is to provide an optical device in which a relative movement between a movable member and a fixed member is supportingly guided only by rolling of balls in actual use, frictional force is minimized during shake correction, and superior shake-correction performance can be obtained.

A further object of the present invention is to provide a lens barrel in which load is applied to a holding member during driving only by a force produced by rolling friction of balls, which is considerably smaller than the sliding frictional force, until the balls each contact a limiting end of a limited range, in which a lens unit for shake correction can be precisely driven even when force for urging the holding member in the optical direction is increased, and in which the urging force can be increased to such a degree that the influence of variations in force in the optical axis direction generated in a flexible printed circuit board for connecting the holding member and a support base is negligible, thereby preventing rattling more reliably.

In order to achieve the above objects, according to an aspect of the present invention, there is provided a lens barrel having an optical axis and including: a lens movable in a direction orthogonal to the optical axis to correct image shake; a movable member that holds the lens; a fixed member that regulates movement of the movable member in a direction of the optical axis; at least three balls placed between the movable member and the fixed member, the balls being held in respective holding portions formed in the movable member or the fixed member so as to roll and to allow a relative movement between the movable member and the fixed member; an urging member that urges the movable member toward the fixed member; driving means for generating force for moving the movable member in two directions orthogonal to the optical axis; and position detecting means for detecting a position of the movable member in the two directions orthogonal to the optical axis.

Further objects, features and advantages of the present invention will become apparent from the following description of the preferred embodiments with reference to the attached drawings.

DESCRIPTION OF THE PREFERRED EMBODIMENTS

A preferred embodiment of the present invention will be described below in detail with reference to the attached drawings.

Figure 1:
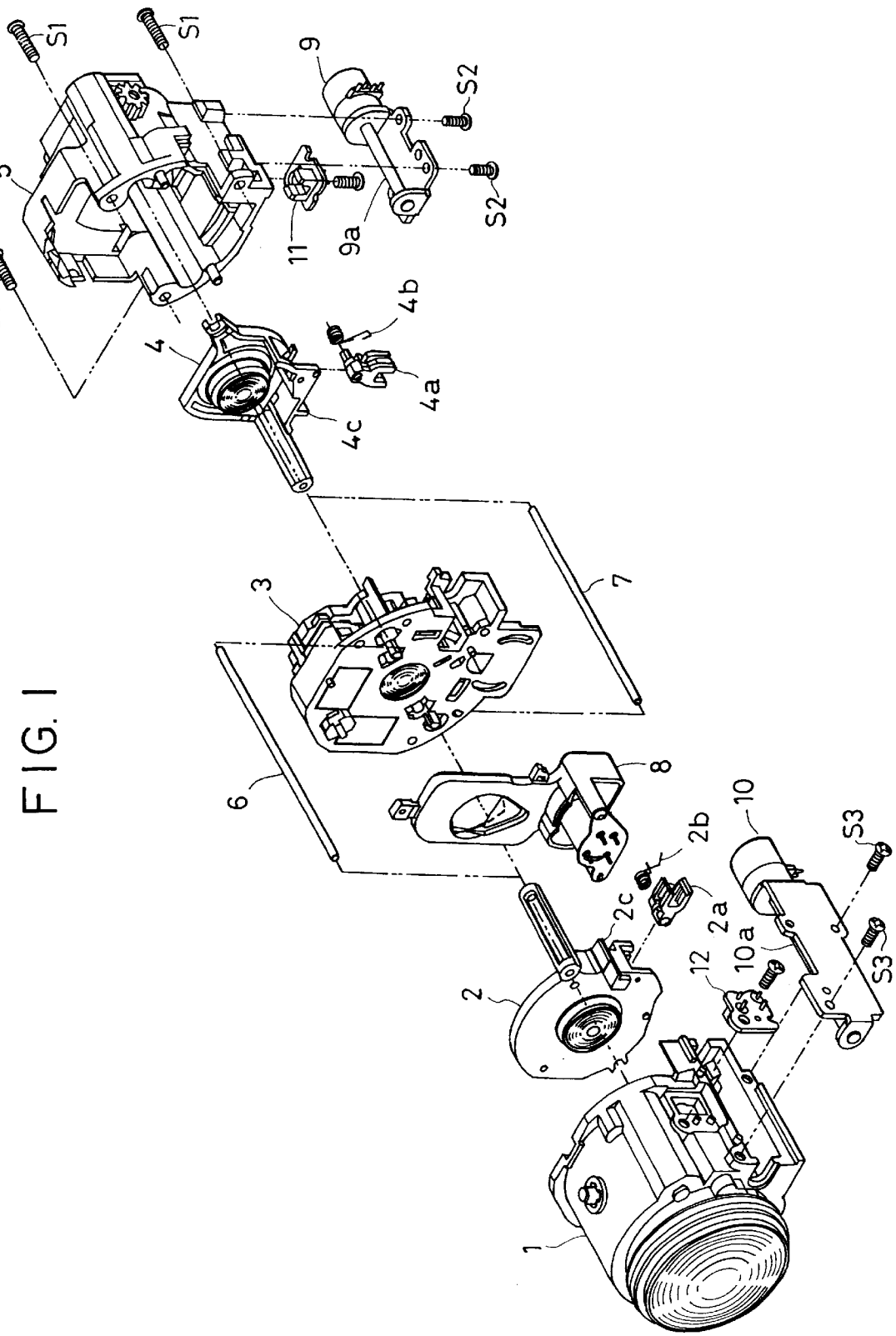
FIG. 1 is an exploded perspective view of a lens barrel according to an embodiment of the present invention.
Figure 2:
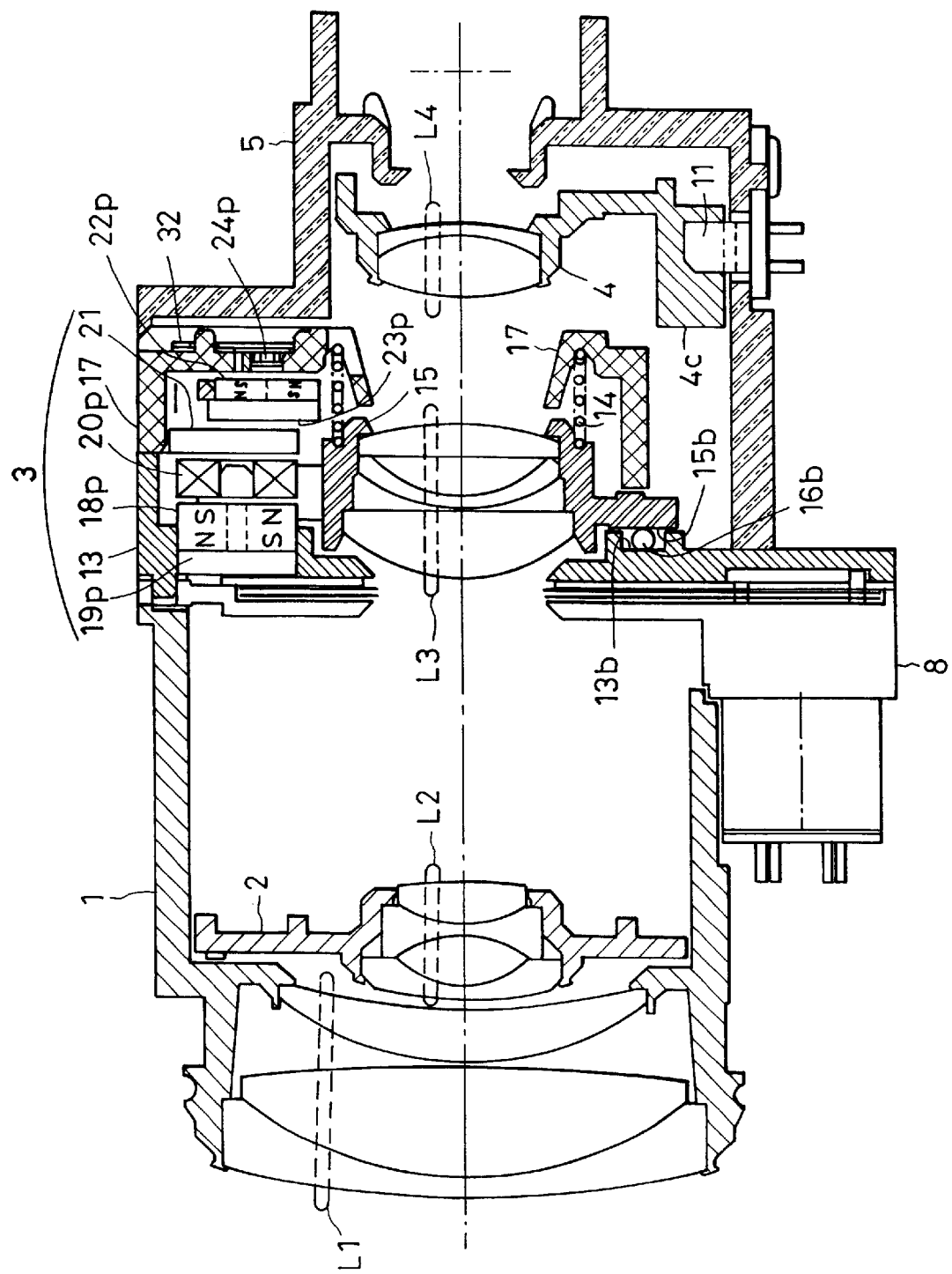
FIG. 2 is a cross-sectional view of the lens barrel.

FIGS. 1 and 2 show a case in which the present invention is applied to a lens barrel having a zoom optical system composed of four convex, concave, convex, and concave lens units. FIG. 1 is an exploded perspective view of the lens barrel, and FIG. 2 is a cross-sectional view showing the principal part of the lens barrel.

Referring to FIGS. 1 and 2, the lens barrel comprises four lens units, a first fixed lens unit L1, a second lens unit L2 that moves in the optical axis direction for zooming, a third lens unit L3 that moves in a plane perpendicular to the optical axis so as to perform shake correction, and a fourth lens unit L4 that moves in the optical axis direction for focusing. The lens barrel also comprises a fixed barrel that holds the first lens unit L1, a movable frame 2 that holds the second lens unit L2, a shift unit 3 that controls movement of the third lens unit L3 in a plane perpendicular to the optical axis, a movable frame 4 that holds the fourth lens unit L4, and a rear barrel 5 on which an image-pickup device, such as a CCD, is mounted. Two guide bars 6 and 7 are fixedly positioned by the fixed barrel 1 and the rear barrel 5, and support the movable frames 2 and 4 for movement in the optical axis direction. The shift unit 3 is positioned and sandwiched between the fixed barrel 1 and the rear barrel 5, and is fastened therebetween, e.g., with three screws S1 from behind.

A diaphragm device 8 changes the aperture diameter of the optical system by moving two aperture blades in opposite directions. A focusing motor 9, serving as driving means, moves the fourth lens unit L4 in the optical axis direction for focusing, and a lead screw 9a thereof is arranged coaxial with a rotor and is engaged with a rack 4a mounted in the movable frame 4 so that the fourth lens unit L4 is moved by rotation of a rotor of the focusing motor 9. The movable frame 4, the guide bars 6 and 7, the rack 4a, and the lead screw 9a are prevented by a helical torsion spring 4b from rattling. A zooming motor 10, serving as driving means, moves the second lens unit L2 in the optical axis direction to perform zooming. A lead screw 10a thereof is arranged coaxial with a rotor and is engaged with a rack 2a mounted in the movable frame 2 so that the second lens unit L2 is moved by rotation of a rotor of the zooming motor 10. The movable frame 2, the guide bars 6 and 7, the rack 2a, and the lead screw 10a are prevented by a helical coil spring 2b from rattling. The focusing motor 9 is fixed to the rear barrel 5 and the zooming motor 10 is fixed to the fixed barrel 1, e.g., by two screws S2, S3, respectively.

A photo-interrupter 11 electrically detects switching between light shading and light transmission by the movement of a shading portion 4c formed in the movable frame 4 in the optical axis direction, and functions as a focus reset switch for detecting the reference position of the fourth lens unit L4. A photo-interrupter 12 electrically detects switching between light shading and light transmission by the movement of a shading portion 2c formed in the movable frame 2 in the optical axis direction, and functions as a zoom reset switch for detecting the reference position of the second lens unit L2.

Figure 3:
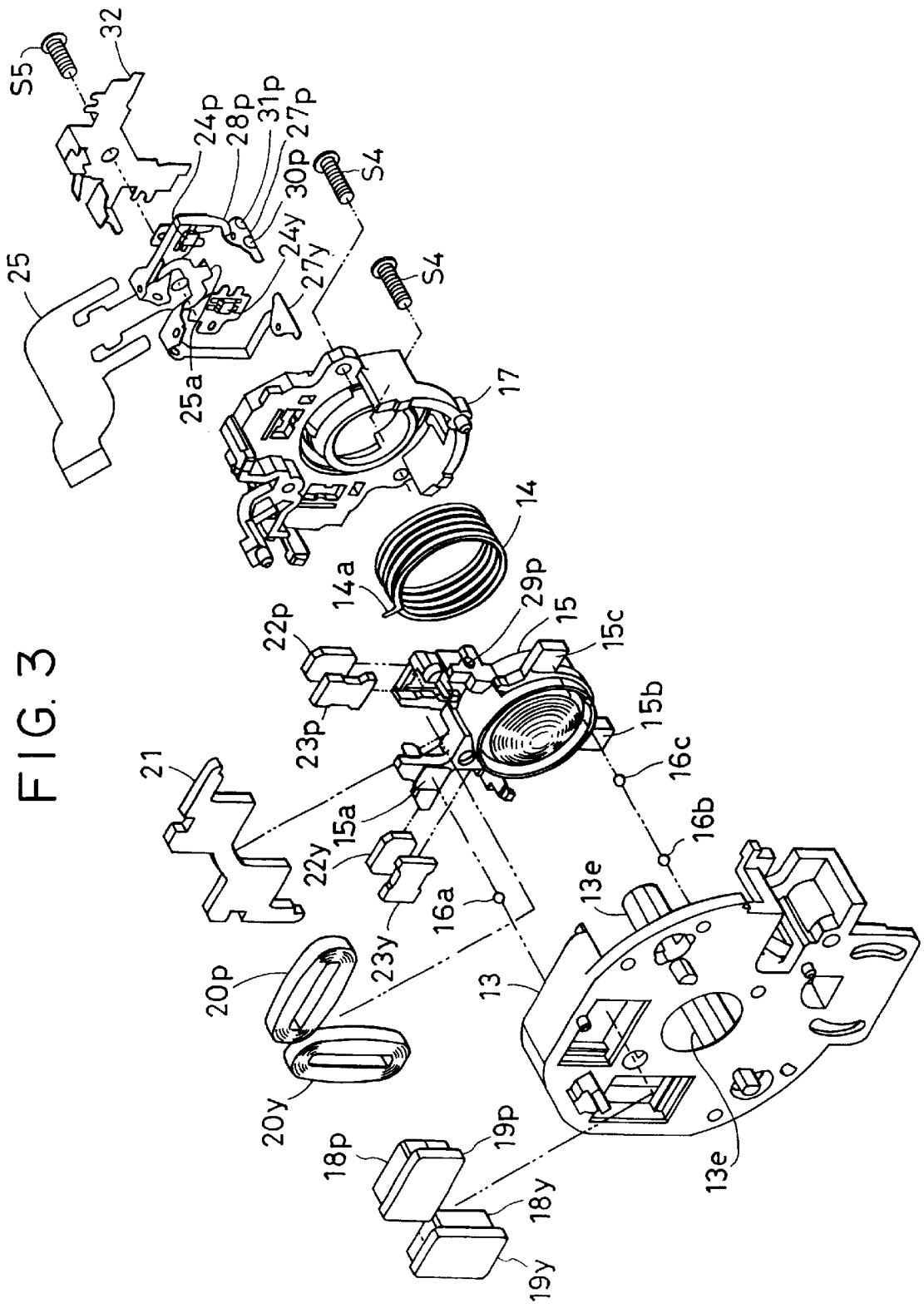
FIG. 3 is an exploded perspective view of a shift unit.
Figure 4:
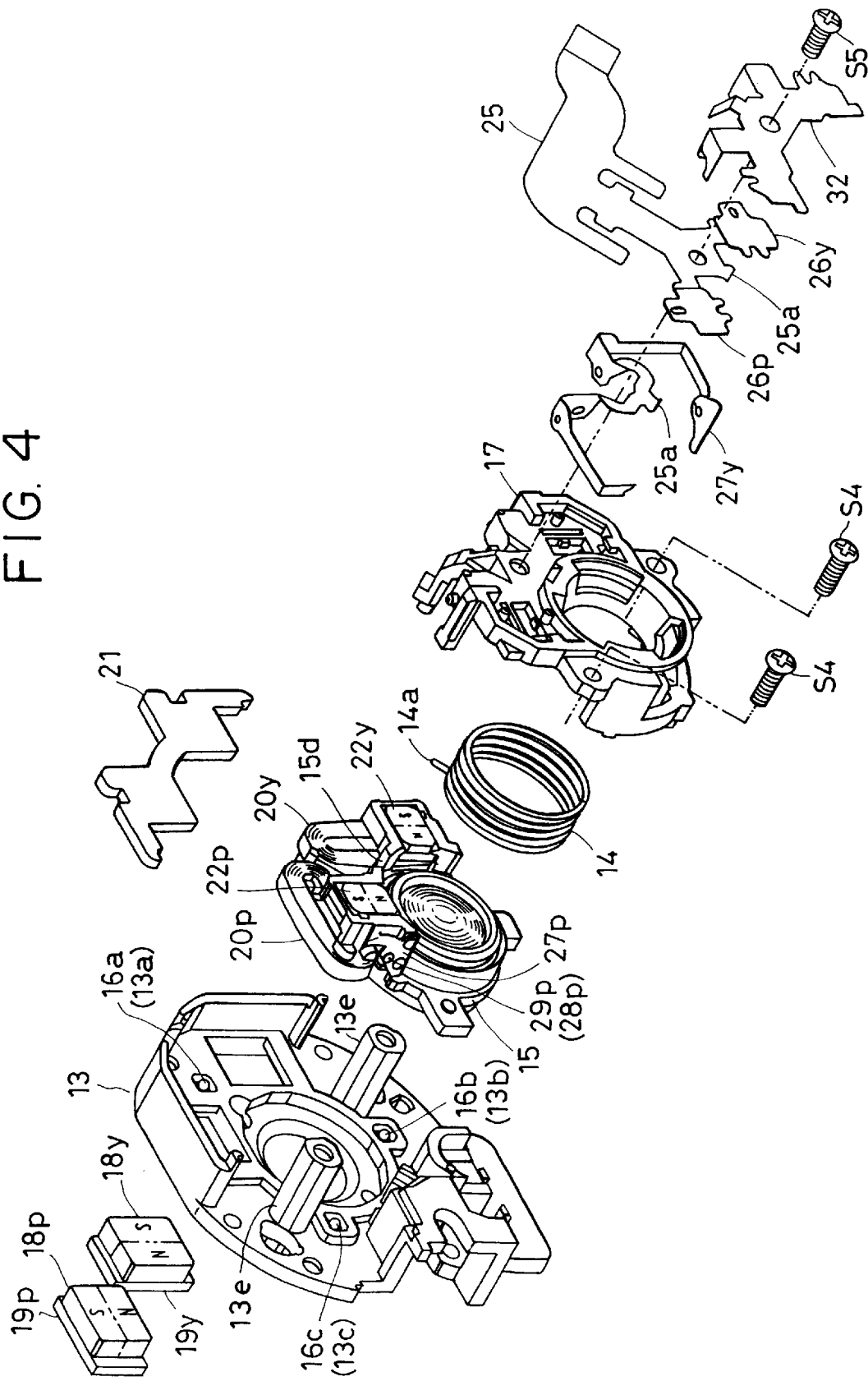
FIG. 4 is also an exploded perspective view of the shift unit.

Description will now be given of the structure of the shift unit 3, which allows the third lens unit L3 to move in the plane perpendicular to the optical axis, with reference to FIGS. 2, 3, and 4. FIGS. 3 and 4 are exploded perspective views of the shift unit 3, respectively, as viewed from the front side (the same direction as that in FIG. 1) and from the rear side.

In order to correct blurring in a pitching direction (an angular change in the vertical direction of a camera) and blurring in a yawing direction (an angular change in the horizontal direction of the camera), the third lens unit L3 is driven along a guide mechanism in a plane perpendicular to the optical axis and is placed in an arbitrary position around the optical axis, under independent control of driving means and a position detecting means for the vertical direction and driving means and a position detecting means for the horizontal direction, which will be described later. While the driving means and the position detecting means for the vertical direction and the driving means and the position detecting means for the horizontal direction are disposed at an angle 90° relative to each other, they have the same structure. Therefore, only the driving means and the position detecting means for the vertical direction will be described (shown in cross-sectional view in FIG. 2). In the figures, reference numerals denoting the components for the vertical direction are supplied with a letter "p", and corresponding reference numerals denoting like components for the horizontal direction are supplied with a letter "y".

A shift base (support base) 13, which is a base of a fixed section of the shift unit 3, serves as a fixed member for regulating a movable member in the optical axis direction. A compression coil spring 14, serving urging means, is preferably made of, for example, a phosphor bronze wire so that it is not attracted by detection and driving magnets placed adjacent thereto, which will be described later. One end portion 14a of the compression coil spring 14 is bent in the radial direction. A shift barrel (holding member) 15 serves as a movable member for holding the third lens unit L3 which is movable. The compression coil spring 14 is fixedly positioned while its front side is fitted in the shift barrel 15 in such a manner as to be substantially coaxial with the optical axis of the third lens unit L3, and the end portion 14a is fitted in a V-groove 15d formed in the shift barrel 15.

Three balls 16a, 16b, and 16c are clamped between the shift base 13 and the shift barrel 15, and are preferably made of, for example, SUS304 (austenitic stainless steel) so that they are not attracted by driving magnets placed adjacent thereto, which will be described later. The shift base 13 is provided in contact with balls 16a, 16b, and 16c on three face portions (bearing surfaces) 13a, 13b, and 13c, and the shift barrel 15 is provided in contact therewith on three face portions (bearing surfaces) 15a, 15b, and 15c. These contact faces lie in a plane perpendicular to the optical axis of the optical system. In a case in which the three balls 16a, 16b, and 16c are the same in outer diameter, the third lens unit L3 can be moved while being held perpendicular to the optical axis, by reducing the differences among the positions of the faces in the optical axis direction.

A sensor base 17 serves as a rear fixed member. The sensor base 17 is positioned relative to the shift base 13, e.g., by two positioning pins 13e, and is connected to the shift base 13, e.g., by two screws S4. The rear side of the compression coil spring 14 is fitted in the sensor base 17 in such a manner that the compression coil spring 14 is substantially coaxial with the optical axis of the lens barrel, and is fixed to the sensor base 17 by, for example, bonding so that the shift barrel 15 positioned on the front side is in a normal angular position. The compression coil spring 14 is compressed between the shift barrel 15 and the sensor base 17 and urges the shift barrel 15 toward the shift base 13 so as to clamp the three balls 16a, 16b, and 16c therebetween. By coating the contact portions between the three balls 16a, 16b, and 16c and the contact faces with a lubricant having such viscosity that the balls 16a, 16b, and 16c do not easily fall out of contact with the contact faces 13a to 13c and 15a to 15c even when they are not clamped between the shift base 13 and the shift barrel 15, an inertial force greater than the urging force acts on the shift barrel 15. This prevents the balls from being easily displaced even in an unclamped state.

Next, the driving means will be described.

A driving magnet 18p has two magnetic poles in the radial direction with respect to the optical axis, a yoke 19p serves to close the magnetic flux path on the front side of the driving magnet 18p in the optical axis direction, and a coil 20p is fixed to the shift barrel 15 by bonding. A yoke 21 serves to close the magnetic flux path on the rear side of the driving magnet 18p in the optical axis direction, and is fixed to the shift base 13 by magnetic force of the magnet so as to form a space between the yoke 21 and the driving magnet 18p where the coil 20p is movable, thereby constituting a magnetic circuit. When current is passed through the coil 20p, a Lorentz force is generated, in a direction nearly perpendicular to the boundary between the poles of the driving magnet 18p, by repulsion between lines of magnetic force produced in the driving magnet 18p and the coil 20p, and the Lorentz force moves the shift barrel 15. That is, the above components constitute a so-called moving coil type driving means. Since driving means as described above is provided both for the vertical and horizontal directions, the shift barrel 15 can be moved in two directions substantially orthogonal to each other.

The relationship between the shift base 13 and the shift barrel 15, and the ball 16b will be described with reference to FIGS. 5A to 5D (this relationship also applies to the other balls).

Figure 5A:
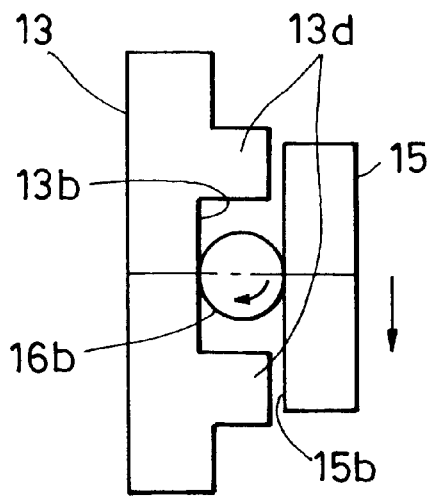
FIGS. 5A to 5D are explanatory views showing a guide mechanism.

FIG. 5A shows a state in which the shift barrel 15 is placed in the center position (the axis of the third lens unit L3 coincides with the optical axes of the other lens units), and in which the ball 16b is placed in the center of an area limited by a regulating portion 13d which is formed as a holding portion around the contact face (bearing surface) 13b of the shift base 13 so as to regulate the movement of the ball 16b.

Figure 5B:
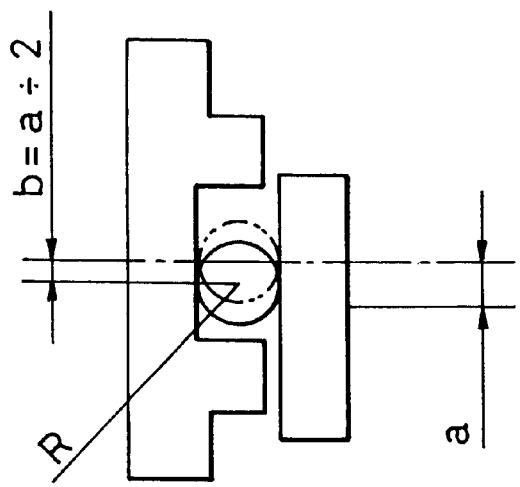

FIG. 5B shows a state in which the shift barrel 15 has been moved by the driving means in the direction of the downward-pointing arrow in FIG. 5A. The shift barrel 15 is moved by a distance "a" from the center position to the mechanical end of the moving range disposed in another position. Since the ball 16b is clamped between the shift base 13 and the shift barrel 15, it rolls in the direction of the arrow in FIG. 5A and reaches a position shown in FIG. 5B. Since rolling friction is significantly smaller than sliding friction, the shift barrel 15 is not moved relative to the shift base 13 by sliding of the ball 16b on the contact faces, but by rolling of the ball 16b. In this case, since the shift barrel 15 and the shift base 13 relatively move with respect to the center of the ball 16b in opposite directions, a moving distance "b" of the ball 16b relative to the shift base 13 is equal to half the moving distance "a" (a/2) of the shift barrel 15, as shown in FIG. 5B.

Figure 5C:
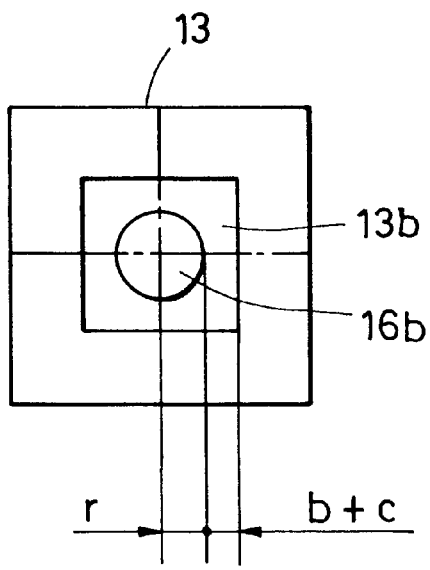

FIG. 5C is a view of the shift base 13 and the ball 16b shown in FIG. 5A, as viewed from the rear side, in which the ball 16b is placed in the center of a vertically and horizontally limited area. A square limited area (inside the regulating portion 13d serving as the holding portion) is formed in the shift base 13 so as to surround the ball 16b. When it is assumed that the radius of the ball 16b is designated "r" and a mechanical allowance is designated "c", the length between the center and the end of the limited area is represented by (r+b+c).

In FIG. 5C, the shift barrel 15 is placed in the center position, and the ball 16b is also placed in the center of the limited area. In a case in which the ball 16b is offset from the center of the limited area by a distance greater than the allowance "c", when the shift barrel 15 is driven, as shown in FIG. 5B, the ball 16b abuts against the limiting end of the shift base 13 before the shift barrel 15 is moved to the mechanical end by the distance "a". When the shift barrel 15 is driven further, it slides to the mechanical end while pressing the ball 16b against the limiting end. When the shift barrel 15 is returned from this state to the center position, the ball 16b rolls and returns to the position at the distance "c" from the center of the limited area.

Figure 5D:
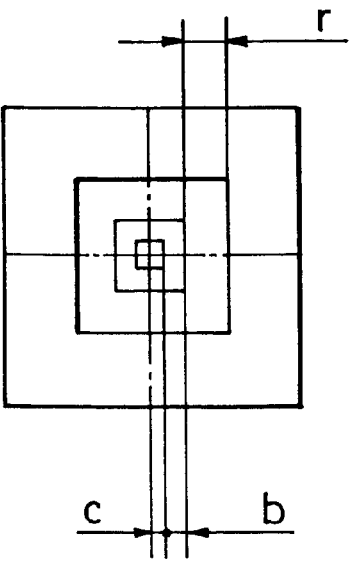

When the shift barrel 15 is moved to both mechanical ends in the vertical direction and the horizontal direction and is then returned to the center position, wherever the ball 16b is initially positioned, the center position thereof is placed in a square defined by lines at the distance "c" from the center of the limited area, as shown in FIG. 5D. These operations are referred to as a ball reset operation. Since the optical performance of the lens is generally designed to be highest when the optical axes of the lens units constituting the lens coincide with one another, it is degraded as the axis of the third lens unit L3 serving as the shift lens unit further deviates from the axes of the other lens units. In an actually required moving area, of course, the optical performance does not matter in practical application.

When the shift barrel 15 is simultaneously moved by the same distance in two orthogonal directions, it is moved by $\sqrt{2}$ times the distance in the diagonal direction. Accordingly, in actual use, the shift barrel 15 is not independently driven in two orthogonal directions, and, in consideration of the other direction, a shake correcting operation is performed within a circular area or a polygonal area substantially shaped like a circle which is centered on the optical axis. The three balls roll inside areas that are half as large as the above area and are similar in shape. While the limited moving areas of the balls are shaped like a quadrilateral having four sides nearly parallel to the two directions substantially orthogonal to each other in which the driving means generates force, if they are shaped like a circle or a polygon similar to the actual moving area of the balls, the balls cannot be precisely reset in the ball reset operation to the correct position so that they do not abut against the limiting ends in actual use.

The ball reset operation is performed in the condition in which the limited ball moving area is shaped like a quadrilateral having four sides nearly parallel to the two substantially mutually orthogonal directions in which the driving means generates force, in which, when the ball is moved toward two sides, the distance between the ball and the other two sides is set to be greater than half the longest possible mechanical moving distance of the shift barrel 15 in the same direction or the maximum moving distance in actual use, and in which the areas of the faces 13a, 13b, and 13c of the shift base 13 and the faces 15a, 15b, and 15c of the shift barrel 15 in contact with the balls 16a, 16b, and 16c are minimized. In this case, the balls do not abut the limiting ends during actual operation, and the shift barrel 15 can be supported and guided only by the rolling of the balls.

Furthermore, by applying a lubricant between the balls and the faces contacted therewith, as described above, the sliding frictional force therebetween can be reduced, and the influence thereof on position control can be lessened.

The diameter of the balls 16a, 16b, and 16c is set to be slightly greater than the height of the regulating portions 13d serving as the holding portions, as shown in FIGS. 5A and 5B, and a small space is formed between the shift base 13 and the shift barrel 15 by the balls 16a, 16b, and 16c.

While the regulating portions 13d for regulating the movement of the balls 16a, 16b, and 16c are formed in the shift base 13 in this embodiment, they may be formed in the shift barrel 15. Furthermore, the number of balls may be more than three.

The position detecting means will now be described.

Referring to FIG. 3, detection magnets 22p and 22y each have two magnetic poles in the radial direction with respect to the optical axis, and yokes 23p and 23y serve to close the magnetic flux paths on the front sides of the detection magnets 22p and 22y in the optical axis direction. Both the detection magnets 22p and 22y and the yokes 23p and 23y are fixed to the shift barrel 15. Hall elements 24p and 24y convert the magnetic flux density into electrical signals and are positioned and fixed to the sensor base 17. The above components constitute position detecting means for detecting the positions of the shift barrel 15 in the pitch direction and the yaw direction.

Figure 6:
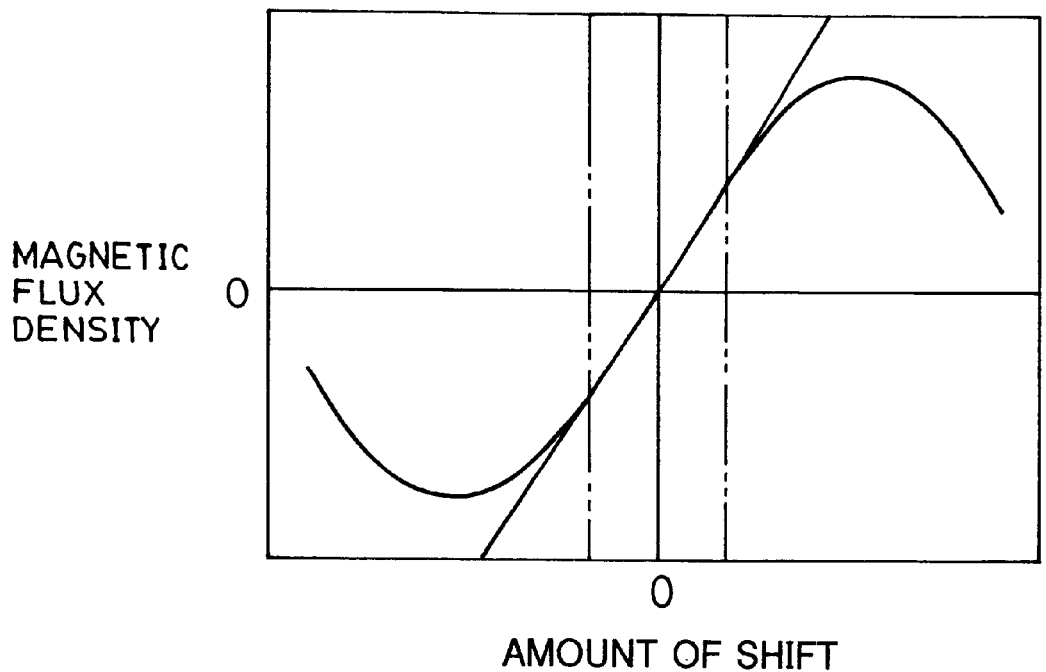
FIG. 6 is an explanatory view of a detection magnet.

FIG. 6 shows the state of the magnetic flux on the rear side of the detection magnet 22p in the optical axis direction.

In FIG. 6, the horizontal axis indicates the position of the shift barrel 15 with respect to the optical axis in the radial direction, and the vertical axis indicates the magnetic flux density. The center of the horizontal axis corresponds to the boundary between the two poles of the detection magnet 22p, where the magnetic flux density is zero. This position also corresponds to a position where the optical axis of the third lens unit L3 nearly coincides with the optical axes of the other lens units. The magnetic flux density linearly changes in an area defined by two-dot chain lines to such a degree that it does not matter in practical use. By detecting the change in magnetic flux density as electrical signals through appropriate signal processing by the Hall element 24p, the position of the third lens unit L3 can be detected.

Figure 7:
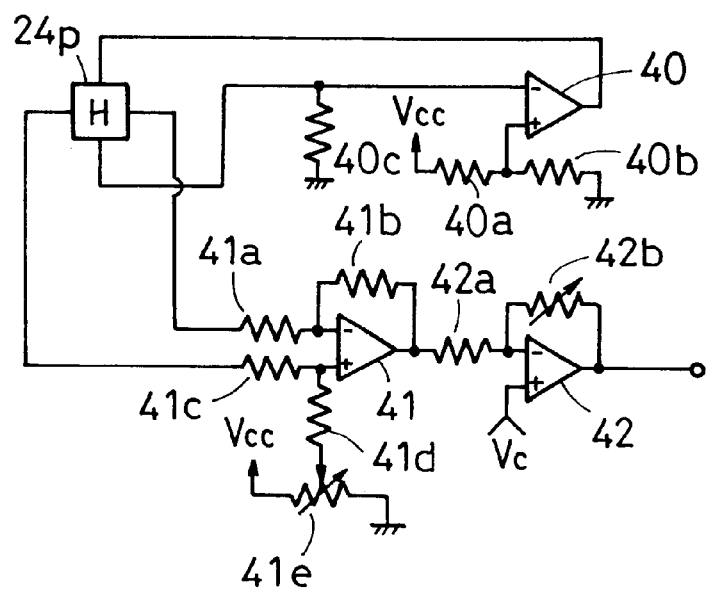
FIG. 7 is a circuit diagram of a signal processing circuit in a Hall element.

FIG. 7 shows an example of a signal processing circuit in the Hall element 24p. An operational amplifier 40 supplies constant current to the Hall element 24p in combination with resistors 40a, 40b, and 40c. The output from the Hall element 24p with respect to the magnetic flux density is subjected to differential amplification by an operational amplifier 41 and resistors 41a, 41b, 41c, and 41d. A variable resistor 41e changes its resistance so as to shift an output electrical signal with respect to the magnetic flux density, and is adjusted so that its output equals a reference potential Vc at a position where the optical axis of the third lens unit L3 coincides with the optical axes of the other lens units. An operational amplifier 42 subjects the output of the operational amplifier 41 to inverting amplification with respect to the reference potential Vc in combination with resistors 42a and 42b, and adjusts the rate of the change in output voltage to the change in magnetic flux density to a predetermined value by changing the resistance of the variable resistor 42b.

Referring again to FIGS. 2 to 4, further description will be given.

A flexible printed circuit board 25 serves to electrically connect the coil 20p and the Hall element 24p to an external circuit. The flexible printed circuit board 25 is bent at a portion 25a, and the Hall element 24p is mounted on the front side of a portion 26p in the optical axis direction. The flexible printed circuit board 25 is further bent at three positions. A hole 28p formed in a leading end portion 27p of the bent portion is rotatably fitted on a pin 29p formed in the shift barrel 15, and both terminals of the coil 20p are soldered to land portions (ground) 30p and 31p formed in the leading end portion 27p. A presser plate 32 is fixed to the sensor base 17, e.g., by a screw S5, so as to fix the flexible printed circuit board 25 to the sensor base 17.

A connecting portion of the flexible printed circuit board 25 for absorbing the motion of the sensor base 17 serving as the fixed member and the shift barrel 15 serving as the movable member will now be described in more detail with reference to FIGS. 8A and 8B.

Figure 8A:
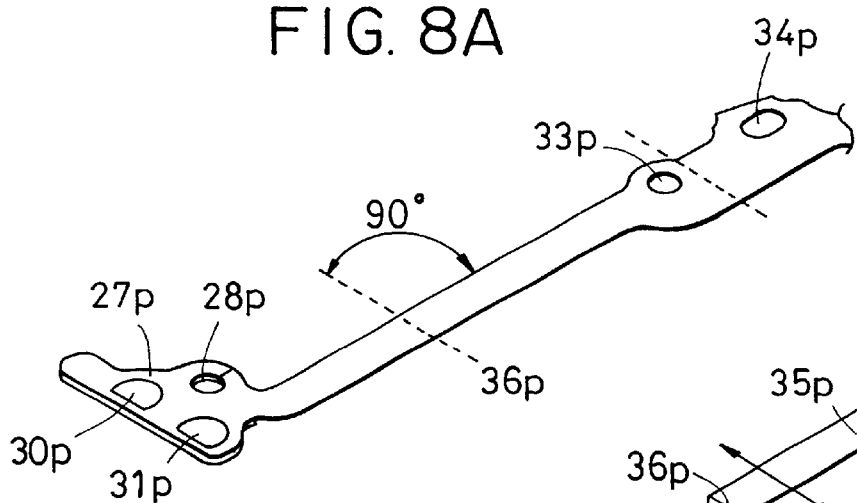
FIGS. 8A and 8B are explanatory views showing a connecting portion of a flexible printed circuit board.
Figure 8B:
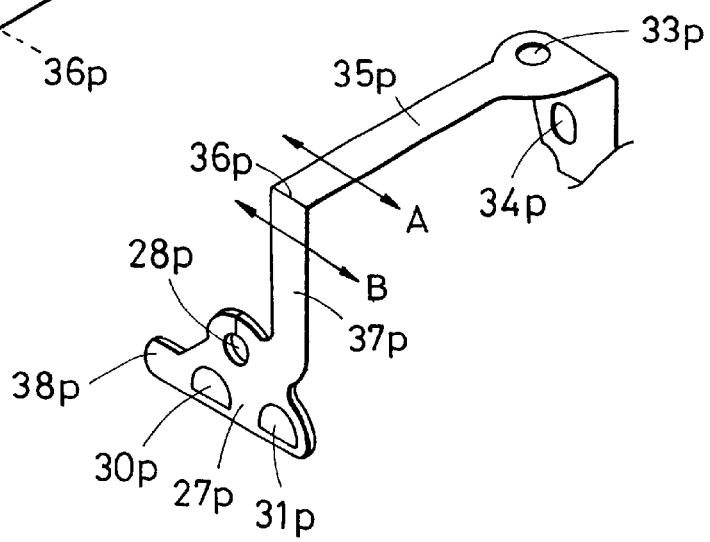

FIG. 8A shows the connecting portion before being bent. A hole 33p and a slot 34p are arranged in the longitudinal direction in a portion to be fixed to the sensor base 17. The sensor base 17 has pins corresponding to the hole 33p and the slot 34p. The position of the fixed portion of the flexible printed circuit board 25 is determined by the hole 33p, and the directions of extension of the portions 35p and 37p from the fixed portion are determined by the slot 34p. A portion of the bent portion between the hole 33p and the slot 34p is pressed against the sensor base 17 by the presser plate 32. The connecting portion is bent at a portion 36p so as to form portions 35p and 37p that form an angle of approximately 90°. The movements of the shift barrel 15 in the vertical direction and the horizontal direction are absorbed by bending of the portions 35p and the 37p in the longitudinal directions of the surfaces. The hole 28p formed in the leading end portion 27p of the flexible printed circuit board 25 is fitted on the pin 29p formed in the shift barrel 15, as described above. The pin 29p is shaped in such a stepped form as to prevent the leading end portion 27p from falling off. A projection 38p of the leading end portion 27p is fitted under a hood formed at a certain distance from a receiving face of the shift barrel 15, so that the leading end portion 27p is also prevented from falling off while it is able to rotate on the pin 29p within a certain range.

In a case in which the bent portion 36p is precisely bent at 90° to the longitudinal direction, the hole 28p of the leading end portion 27p is positioned at the pin 29p, and therefore, unnatural deformation does not occur in the portions 35p and 37p of the flexible printed circuit board 25. In contrast, in a case in which the bent portion 36p is bent at an angle offset from 90° to the longitudinal direction, the positions of the hole 28p of the leading end portion 27p and the pin 29p are offset from each other because the bending is tilted in the optical axis direction. Since the leading end portion 27p can be rotated by an amount corresponding to the offset in this case, the portions 35p and 37p are twisted so as to absorb the offset of the bent portion 36p. If the leading end portion 27p is unable to rotate, when the bent portion 36p is displaced, forces in the longitudinal direction (in the directions of arrows A and B in FIG. 8B) act on the portions 35p and 37p so that they are not easily bent, and the shift barrel 15 is strongly pressed in the optical axis direction. This causes undesirable variations in urging force.

Even when the presser plate 32 is displaced from the connecting portion fixed to the sensor base 17 and the direction of extension of the flexible printed circuit board 25 is thereby slightly displaced, since the position of the hole 28p relative to the pin 29p in the optical axis direction is also displaced, the force generated in the flexible printed circuit board 25 is reduced by rotating the leading end portion 27p.

Figure 9A:
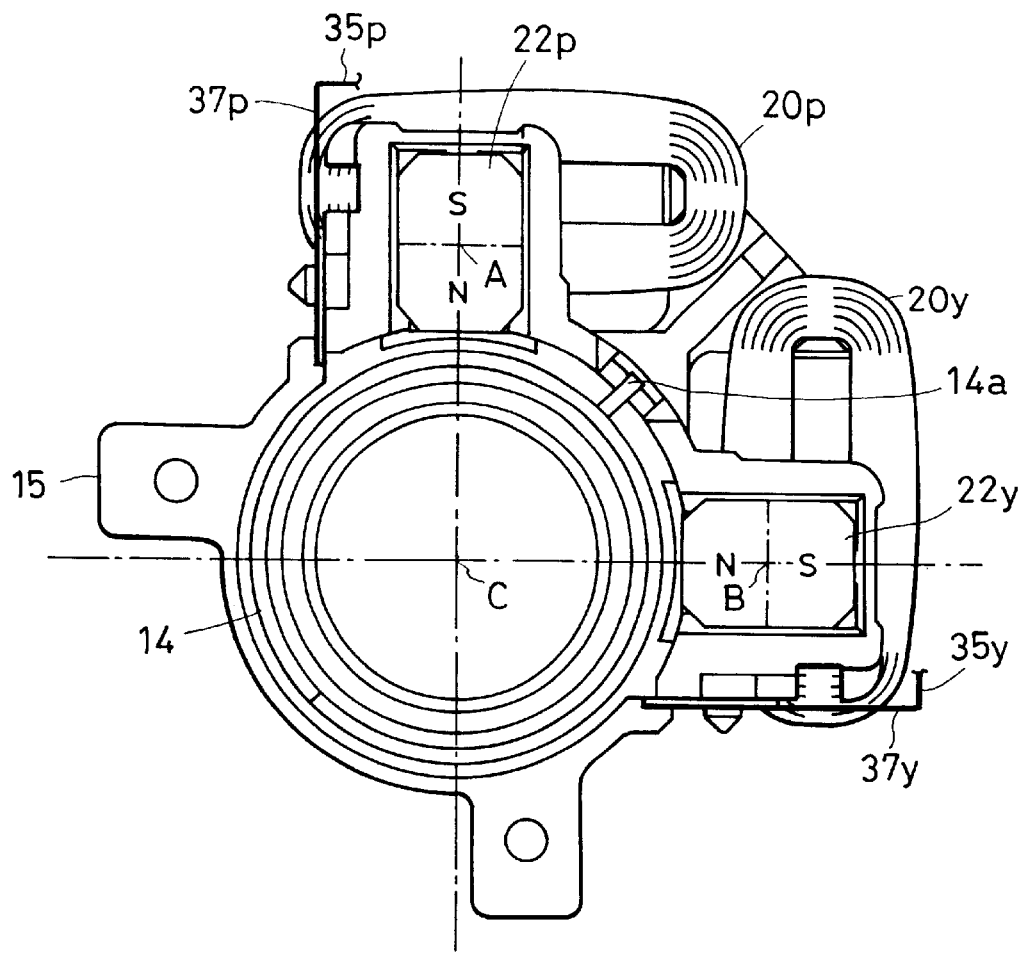
FIGS. 9A and 9B are explanatory views showing a rotation regulating function.
Figure 9B:
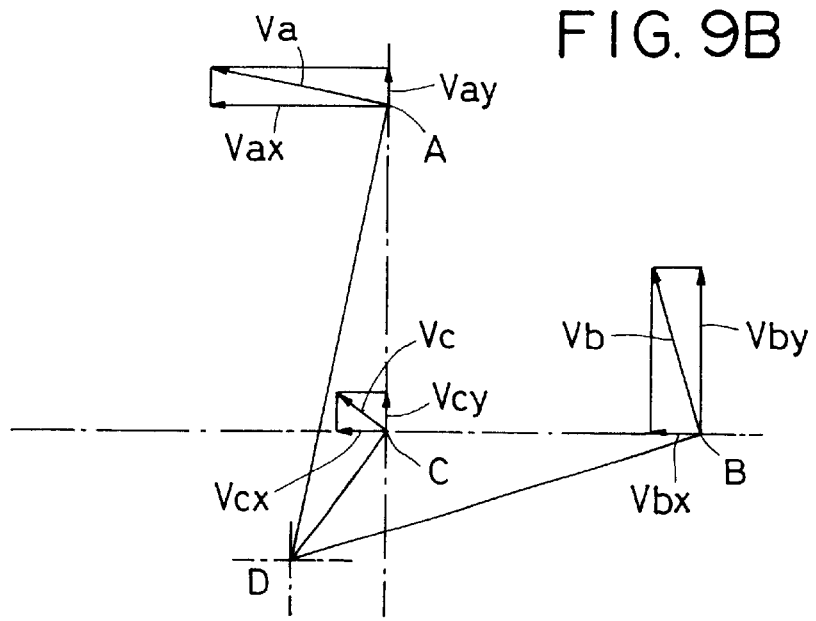

With reference to FIGS. 9A and 9B, description will be given of the structure and layout of the position detecting means and the function and motion of the compression coil spring 14 for regulating rotation of the movable section.

FIG. 9A is a view of the movable section, as viewed from the rear side in the optical axis direction. The compression coil spring 14 serving as the urging member is fitted in the shift barrel 15 so as to be coaxial with the optical axis. The compression coil spring 14 is fixed to the shift barrel 15 at one end portion 14a and is fixed to the shift base 17 at the other end, as described above. When the shift barrel 15 is rotated about the optical axis, it is returned to its initial position by a resilient twisting force of the compression coil spring 14 centered on the center axis, that is, the shift barrel 15 is restrained from rotating.

The boundaries between the poles of the detection magnets 22p and 22y are placed perpendicular to the detecting directions of the Hall elements 24p and 24y (the vertical direction and the horizontal direction in FIG. 9A). For example, when the shift barrel 15 is shifted in such a manner that one of the Hall elements placed at a point A in FIG. 9A moves along line C-A on the magnet 22p, the other Hall element placed at a point B moves on the boundary between the poles of the magnet 22y. Therefore, a change of the magnetic flux distribution in the pitch direction is detected, whereas the magnetic flux distribution in the yaw direction is not changed. This shows that the positions in two axis directions can be detected independently. Since the intersection of the detecting directions of the two position detecting means coincides with the optical axis, in practice, large changes in output value are not made and the changes are within a relatively narrow range of angles of rotation about the optical axis. Since the compression coil spring 14 only regulates rotation of the shift barrel 15, when driving force is applied from the driving means to the shift barrel 15, the shift barrel 15 is sometimes rotated about the optical axis, depending on the positional relationship between the position where the force is generated by the driving means and the gravity of the shift barrel 15, and the connected position and shape of the flexible printed circuit board 25.

FIG. 9B shows changes in output values from the position detecting means in this case.

Description will be given of shifting of a vertical position detecting point A, a horizontal position detecting point B, and the optical axis C of the lens unit when the shift barrel 15 rotates on a point D. When the rotation angle of the shift barrel 15 is not so large, the points A, B, and C shift in the directions perpendicular to lines connecting the points A, B, and C, and the point D. The motion vectors of the points A, B, and C are designated Va, Vb, and Vc, and are broken down into components Vax and Vay, Vbx and Vby, and Vcx and Vcy, respectively, in the two position detecting directions. Since the position detecting means are not sensitive in directions perpendicular to the detection axes, as described above, they do not detect the components Vax and Vby.

Since the intersection of the two detection axes coincides with the optical axis C, the relationships Vcx=Vbx and Vcy=Vay hold. This shows that the change of the optical axis of the third lens unit L3 with the rotation about the point offset from the optical axis, that is, the shift amount, can be precisely detected by the position detecting means independently of the rotation. As a result, the shift barrel 15 can be placed into the correct position under positioning control using the driving means and the detecting means, which will be described later.

Figure 10:
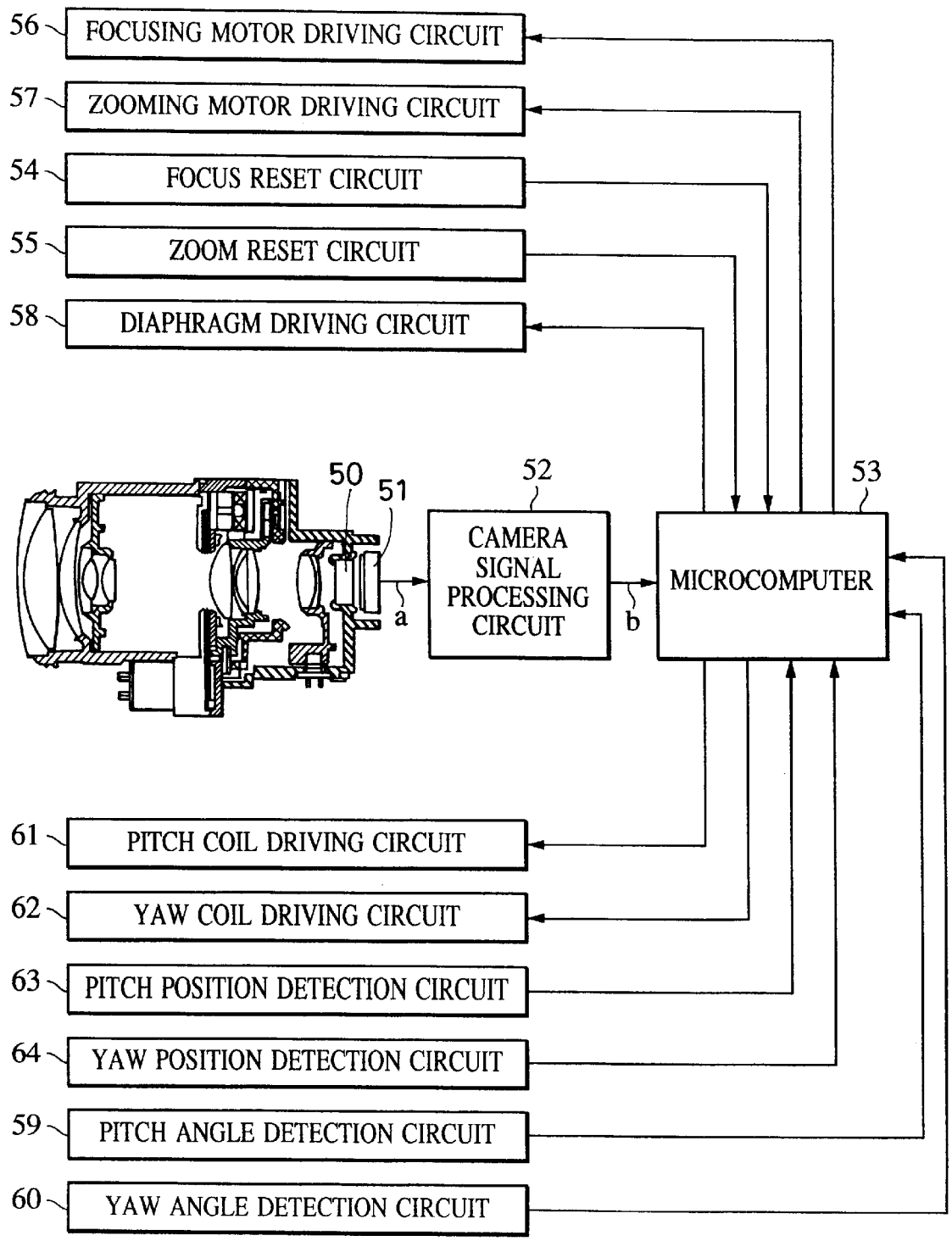
FIG. 10 is a system diagram of a shake-correcting lens.

FIG. 10 is a system diagram of an optical device including the lens barrel shown in FIGS. 1 and 2 having a shake-correcting function, explaining the driving and shake correction of the lens barrel.

An optical low-pass filter 50 serves to remove high-frequency components in the spatial frequency of a subject, and a CCD 51 serves as an image pickup element for converting an optical image placed on a focal plane into electrical signals. A signal "a" read from the CCD 51 is converted into an image signal by a camera signal processing circuit 52. When power is on, a microcomputer 53 for controlling the lens driving monitors the outputs from a focus reset circuit 54 and a zoom reset circuit 55, and rotates stepping motors with a focusing motor driving circuit 56 and a zooming motor driving circuit 57 so as to move the movable frame 2 and the movable frame 4 in the optical axis direction. When the movable frames 2 and 4 reach respective preset positions (when the shading portions of the movable frames reach the boundaries where they block or transmit light from light-emitting portions of the photo-interrupters in the fixed section), the outputs from the focus reset circuit 54 and the zoom reset circuit 55 are inverted. By counting the number of subsequent driving steps of the stepping motors with reference to the positions, the microcomputer 53 can detect the absolute positions of the lens units. This allows precise focal distance information. These operations are referred to as a "zoom and focus reset operation".

A diaphragm driving circuit 58 serves to drive the diaphragm device 8 and controls the aperture diameter of the diaphragm based on information "b" about the intensity of the image signal fetched by the microcomputer 53. A pitch angle (tilting angle in the vertical direction) detection circuit 59 and a yaw angle (tilting angle in the horizontal direction) detection circuit 60 each detect a tilt angle by, for example, integrating the output from an angular velocity sensor, such as a vibrating gyroscope, fixed to the optical device. The output from the circuits 59 and 60, that is, information about the tilting angle of the optical device, is fetched into the microcomputer 53. A pitch (vertical direction) coil driving circuit 61 and a yaw (horizontal direction) coil driving circuit 62 serve to shift the third lens unit L3 perpendicularly to the optical axis to perform shake correction. In each of the circuits 61 and 62, a driving force for shifting the third lens unit L3 is generated by a so-called moving coil structure in which a coil is placed in a gap of a magnetic circuit including a magnet. A pitch position detection circuit 63 and a yaw position detection circuit 64 each detect the amount of shift of the third lens unit L3 from the optical axis, and the output therefrom is fetched into the microcomputer 53. When the third lens unit L3 is moved perpendicularly to the optical axis, transmitted light is deflected, and the position of an image of a subject formed on the CCD 51 is shifted. The microcomputer 53 controls the shift of the image in this case so that the amount of shift is the same as in a case in which the image is shifted due to actual tilting of the optical device and so that the direction of shift is opposite from that in that case, even when the optical device is tilted (hand shake occurs), the formed image is not shifted, that is, shake correction is accomplished.

The microcomputer 53 finds differences between tilt signals of the optical device obtained from the pitch angle detection circuit 59 and the yaw angle detection circuit 60, and shift amount signals of the third lens unit L3 obtained from the pitch position detection circuit 63 and the yaw position detection circuit 64, and the shift barrel 15 is driven by the pitch coil driving circuit 61 and the yaw coil driving circuit 62 based on signals obtained by subjecting the difference signals to amplification and appropriate phase compensation. Under this control, the third lens unit L3 is positioned so that the difference signals are reduced, and is held at a desired position.

In this embodiment, since the third lens unit L3 to be shifted perpendicularly to the optical axis is disposed offset from the second lens unit L2 for zooming toward the image pickup side, the amount of shift of the image in response to the amount of shift of the third lens unit L3 varies depending on the position of the second lens unit L2, that is, the focal length. Therefore, the amount of shift of the third lens unit L3 is not determined only based on the tilt signals of the optical device obtained from the pitch angle detection circuit 59 and the yaw angle detection circuit 60, but is corrected based on information about the position of the second lens unit L2, so that the shift of the image due to the tilting of the optical device is canceled by the shift of the third lens unit L3.

While the shake correcting operation has been described above, by performing the above-described ball reset operation subsequent to or simultaneously in a time-sharing manner with the zoom and focus reset operation performed when the power is turned on, even when the balls are displaced from the correct positions due to, for example, a shock received during a non-operating state of the optical device, satisfactory shake correction can be made by the rolling of the balls immediately after the reset operation is performed. Furthermore, superior shake correction can be constantly ensured by detecting, with the microcomputer, time periods (for example, by detecting the tilting angle, it is determined whether the optical device is being carried) other than the operation period of the optical device (for example, when an image is observed with the monitor, or when an image is recorded in a recording device), and by appropriately performing the ball reset operation within the time periods.

The shake correction angle generally ranges from 0.50° to 1°. In an actual image capturing operation, the optical device is moved by angles greater than the above correction angles when operating the functions of the optical device and finding a subject through the finder. Therefore, the ball reset operation may be performed based on the movement of the optical device. Although shake-correction performance is degraded for a moment due to discontinuous increases in frictional force when the rolling friction of the balls shifts to sliding friction, after the optical device is moved by an angle greater than the correction angle range, subsequent guide operations are performed by rolling of the balls. As a result, superior shake correction is possible.

The present invention is also applicable to lens barrels having a shake-correcting function to be incorporated in image-capturing devices, such as video cameras and digital still cameras for capturing motion pictures and still pictures by a solid-state image pickup device, such as a CCD, placed in the focal plane of the optical system, and in observation devices, such as binoculars and astronomical telescopes, for observing an image of a subject obtained from the optical system with the naked eye.

While the fixed member is combined with the barrel and does not move in the optical axis direction in the above embodiment, the present invention is also applicable to lens barrels in which a shake correcting lens unit is movable in the optical axis direction in a zooming operation, a focusing operation, or the like.

As described above, load is applied to the movable member during driving only by a force produced by rolling friction of the balls, which is considerably smaller than the sliding frictional force, until the balls each contact a limiting end of a limited range, a lens unit for shake correction can be precisely driven even when a force for urging the movable member in the optical direction is increased, and the urging force can be increased to such a degree that the influence of variations in force in the optical axis direction generated in a flexible printed circuit board for connecting the movable member and a fixed member is negligible, thereby preventing rattling more reliably.

The balls are prevented from being attracted by the magnet as a component of the driving means or the position detecting means placed adjacent thereto, and this improves the assembly efficiency. Moreover, the balls are prevented from being easily displaced even when an urging force for the balls is removed due to a shock given in the optical axis direction or the like.

Even when the urging force for the balls is removed due to a shock in the optical axis direction or the like and only gravity or an inertial force acts on the balls, the balls are prevented from being displaced easily. Furthermore, sliding frictional force between the balls and faces in contact therewith is substantially reduced. This makes it possible to prevent the balls and the contact faces of the movable member from being easily displaced even when the balls each contact the limiting end while the movable member is driven, and to thereby reduce the influence of displacement on the position control of the movable member.

Since the position of the lens unit is not changed by rotation of the movable member about the optical axis, it is possible to provide more precise position detection and position control with a simple structure.

The urging function and the rotation restraint function can be achieved with a simple structure in a limited space adjacent to the optical axis. Since a single compression coil spring is used, it is possible to avoid problems resulting from variations in shape and characteristics among a plurality of compression coil springs.

The compression coil spring is prevented from being attracted by the magnet as a component of the driving means or the position detecting means placed adjacent thereto, and this improves the assembly efficiency. Furthermore, since undesirable force is not applied to the movable member in a direction perpendicular to the optical axis and undesirable influence is not exerted on the position detecting means, precise and efficient shake correction is possible.

The areas of faces (bearing surfaces) in contact with the balls are minimized. This allows sufficient space and high figure tolerance of the components.

Relative movement between the movable member and the fixed member is supported and guided only by rolling of the balls in actual use, and frictional force is minimized during shake correction. This allows superior shake-correction performance.

Load is applied to the holding member during driving only by force produced by rolling friction of the balls, which is considerably smaller than the sliding frictional force, until the balls each contact a limiting end of a limited range, a lens unit for shake correction can be precisely driven even when force for urging the holding member in the optical direction is increased, and the urging force can be increased to such a degree that the influence of variations in force in the optical axis direction generated in the flexible printed circuit board for connecting the holding member and the support base is negligible, thereby preventing rattling more reliably.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens barrel comprising:

a lens;

a movable member that holds said lens, said movable member being movable in a direction orthogonal to an optical axis of the lens barrel;

a fixed member that regulates movement of said movable member in a direction of the optical axis of the lens;

at least three balls placed between said movable member and said fixed member, said at least three balls being held in respective holding portions formed in one of said movable member and said fixed member so as to roll and to allow relative movement between said movable member and said fixed member;

an urging member that urges said movable member toward said fixed member;

a driving device that moves said movable member in a direction orthogonal to the optical axis of the lens; and a position detecting device that detects positions of said movable member in the direction orthogonal to the optical axis of the lens, wherein each of the holding portions has a size and shape sufficient to permit the respective ball to roll without abutting limiting ends of the holding portion during normal operation.

2. A lens barrel according to claim 1, wherein at least one of said driving device and said position detecting device includes a magnet, and said at least three balls are made of a material that does not exhibit appreciable magnetic interaction with said magnet.

3. A lens barrel according to claim 1, wherein said respective holding portions for holding said at least three balls therein are coated with a lubricant having a viscosity sufficient to maintain said at least three balls in contact with said respective holding portions in a state in which said movable member is not urged toward said fixed member.

4. A lens barrel according to claim 1, wherein said urging member restrains said movable member from rotating about the optical axis of the lens barrel.

5. A lens barrel according to claim 1, wherein said position detecting device includes two position detecting units respectively placed at two points in two directions orthogonal to the optical axis of the lens, and a point of intersection between detecting directions of said two position detecting units coincides with the optical axis of the lens.

6. A lens barrel according to claim 1, wherein said urging member is a compression coil spring, and said compression coil spring is arranged so as to be substantially coaxial with the optical axis of the lens.

7. A lens barrel according to claim 1, wherein at least one of said driving device and said position detecting device includes a magnet, said urging member is a compression coil spring, and said compression coil spring is made of a material that does not exhibit appreciable magnetic interaction with said magnet.

8. A lens barrel according to claim 1, wherein each of said respective holding portions has a generally quadrangular shape having four sides, and the length of one of the sides of each holding portion is greater than half a maximum moving distance of said movable member.

9. A lens barrel comprising:

a lens;

a movable member that holds said lens, said movable member being movable in a direction orthogonal to an optical axis of said lens;

a fixed member that regulates movement of said movable member in a direction of the optical axis of the lens;

at least three balls placed between said movable member and said fixed member, said at least three balls being held in respective holding portions formed in one of said movable member and said fixed member so as to roll and to allow relative movement between said movable member and said fixed member;

an urging member that urges said movable member toward said fixed member;

a driving device that generates force for moving said movable member in two directions orthogonal to the optical axis of the lens;

a position detecting device that detects positions of said movable member in the two directions orthogonal to the optical axis of the lens; and a control device that controls movement of said movable member, said control device placing a relative position among said at least three balls, said movable member, and said fixed member within a predetermined range including the center of a maximum moving range of said movable member before a shake correcting operation for driving said movable member by first driving said movable member by a distance corresponding to the maximum moving range in the two directions orthogonal to the optical axis of the lens, and then driving said movable member to the midpoint of the maximum moving range in the two directions orthogonal to the optical axis of the lens.

10. A lens barrel having an image-capturing lens including a plurality of lenses, and a movable member for holding at least one of the plurality of lenses in the image-capturing lens, said lens barrel correcting shake by driving the movable member relative to a fixed member in a direction orthogonal to an optical axis of the image-capturing lens, said lens barrel comprising:

an urging member that urges the movable member toward the fixed member;

at least three balls arranged in rolling contact with the movable member and the fixed member and movable relative to the movable member and the fixed member;

at least three regulating portions formed in one of the fixed member and the movable member so as to respectively regulate moving ranges of said at least three balls; and a driving device that drives the movable member within a range where said at least three balls are movable, wherein each of the regulating portions has a size and shape sufficient to permit the respective ball to roll without abutting limiting ends of the regulating portion during normal operation.

11. A lens barrel according to claim 10, wherein each of said regulating portions has a generally polygonal shape, as viewed in a direction of the optical axis of the lens barrel.

12. A lens barrel according to claim 10, wherein each of said regulating portions has a generally quadrangular shape, as viewed in a direction of the optical axis of the lens barrel.

13. An optical device comprising:

a lens;

a movable member that holds said lens, said movable member being movable in a direction orthogonal to an optical axis of the lens;

a fixed member that regulates movement of said movable member in a direction of the optical axis of the lens;

at least three balls placed between said movable member and said fixed member, said at least three balls being held in respective holding portions formed in one of said movable member and said fixed member so as to roll and to allow relative movement between said movable member and said fixed member;

an urging member that urges said movable member toward said fixed member;

a driving device that generates force for moving said movable member in a direction orthogonal to the optical axis of the lens; and a position detecting device that detects positions of said movable member in the direction orthogonal to the optical axis of the lens, wherein each of the holding portions has a size and shape sufficient to permit the respective ball to roll without abutting limiting ends of the holding portion during normal operation.

14. An optical device according to claim 13, wherein at least one of said driving device and said position detecting device includes a magnet, and said at least three balls are made of a material that does not exhibit appreciable magnetic interaction with said magnet.

15. An optical device according to claim 13, wherein said respective holding portions for holding said at least three balls therein are coated with a lubricant having a viscosity sufficient to maintain said at least three balls in contact with said respective holding portions in a state in which said movable member is not urged toward said fixed member.

16. An optical device according to claim 13, wherein said urging member restrains said movable member from rotating about the optical axis of the lens.

17. An optical device according to claim 13, wherein said position detecting device includes two position detecting units respectively placed at two points in two directions orthogonal to the optical axis of the lens, and a point of intersection between detecting directions of said two position detecting units coincides with the optical axis of the lens.

18. An optical device according to claim 13, wherein said urging member is a compression coil spring, and said compression coil spring is placed so as to be substantially coaxial with the optical axis of the lens.

19. An optical device according to claim 13, wherein at least one of said driving device and said position detecting device includes a magnet, said urging member is a compression coil spring, and said compression coil spring is made of a material that does not exhibit appreciable magnetic interaction with said magnet.

20. An optical device according to claim 13, wherein each of said respective holding portions has a generally quadrangular shape having four sides, and the length of one of the sides of each holding portion is greater than half a maximum moving distance of said movable member.

21. An optical device comprising:

a lens;

a movable member that holds said lens, said movable member being movable in a direction orthogonal to an optical axis of the lens;

a fixed member that regulates movement of said movable member in a direction of the optical axis of the lens;

at least three balls placed between said movable member and said fixed member, said at least three balls being held in respective holding portions formed in one of said movable member and said fixed member so as to roll and to allow relative movement between said movable member and said fixed member;

an urging member that urges said movable member toward said fixed member;

a driving device that drives said movable member in two directions orthogonal to the optical axis of the lens;

a position detecting device that detects positions of said movable member in the two directions orthogonal to the optical axis of the lens; and a control device that controls movement of said movable member, said control device placing a relative position among said at least three balls, said movable member, and said fixed member within a predetermined range including the center of a maximum moving range of said movable member before a shake correcting operation for driving said movable member by first driving said movable member by a distance corresponding to the maximum moving range in the two directions orthogonal to the optical axis of the lens, and then driving said movable member to the midpoint of the maximum moving range in the two directions.

22. An optical device having an image-capturing lens including a plurality of lenses, and a movable member for holding at least one of the plurality of lenses in the image-capturing lens, said optical device correcting shake by driving the movable member relative to a fixed member in a direction orthogonal to the optical axis of the image-capturing lens, said optical device comprising:

an urging member that urges the movable member toward the fixed member:
  at least three balls in rolling contact with the movable member and the fixed member and movable relative to the movable member and the fixed member;
  at least three regulating portions formed in one of the fixed member and the movable member so as to regulate moving ranges of said at least three balls; and
  a driving device that drives the movable member within a range where said at least three balls are movable,
wherein each of the regulating portions has a size and shape sufficient to permit the respective ball to roll without abutting limiting ends of the regulating portion during normal operation.

23. An optical device according to claim 22, wherein each of said at least three regulating portions has a generally polygonal shape, as viewed in a direction of the optical axis of the optical device.

24. An optical device according to claim 22, wherein each of said at least three regulating portions has a generally quadrangular shape, as viewed in a direction of the optical axis direction of the optical device.

25. A lens barrel comprising:

a lens;

a movable member that holds said lens, said movable member being movable in two directions orthogonal to an optical axis of said lens;

a fixed member that regulates movement of said movable member in a direction of the optical axis of said lens;

at least three balls placed between said movable member and said fixed member, each of said at least three balls being held in a range surrounded by a respective plurality of regulating pardons, so as to roll and to allow relative movement between said movable member and said fixed member an urging member that urges said movable member toward said fixed member; and a driving device that generates forte for moving said movable member in the two directions orthogonal to the optical axis of said lens;

wherein for each ball an interval of the regulating portions, where each of the regulating portions faces each other, is wider in the two directions orthogonal to the optical axis of said lens of said movable member than the interval r+b, wherein r is the radius of the ball, and b is half of the maximum moving distance of said movable member.

26. A lens barrel comprising:

a lens;

a movable member that holds said lens, said movable member being movable in a direction orthogonal to an optical axis of said lens;

a fixed member that regulates movement of said movable member in a direction of the optical axis of said lens;

a plurality of rotating members placed between said movable member and said fixed member, each of said plurality of rotating members being held in a range surrounded by a respective plurality of regulating portions towed on said fixed member so as to mu and to allow relative movement between said movable member and said fixed member;

an urging member that urges said movable member toward said fixed member; and a driving device that generates force for moving said movable member in the direction orthogonal to the optical axis of said lens;

wherein for each rotating member an interval of the regulating portions, where each of the regulating portions faces each other, is wider in the direction orthogonal to the optical axis of said lens of said movable member than the interval r+b, wherein r is the radius of the rotating member, and b is half of the maximum moving distance of said movable member.

27. A lens barrel according to claim 25, wherein the range surrounded by said plurality of regulating portions is formed by said movable member.

28. A lens barrel comprising:

a lens;

a movable member that holds said lens, said movable member being movable in a direction orthogonal to an optical axis of said lens;

a fixed member that regulates movement of said movable member in a direction at&t optical axis of said lens;

a plurality of rotating members placed between said movable member and said fixed member, each of said plurality of rotating members rotating without contacting portions other than contact faces of said movable member and said fixed member when said movable member is moving;

an urging member that urges said movable member toward said fixed member; and a driving device that generates force for moving said movable member in the direction orthogonal to the optical axis of said lens.

29. An optical device comprising:

a lens;

a movable member that holds said lens, said movable member being movable in a direction orthogonal to an optical axis of said lens;

a fixed member that regulates movement of said movable member in a direction of the optical axis of said lens;

at least three balls placed between said movable member and said fixed member, each of said at least three balls being held in a range surrounded by a respective plurality of regulating portions so as to roll and to allow relative movement between said movable member and said fixed member;

an urging member that urges said movable member toward said fixed member; and a driving device that generates force for moving said movable member in the two directions orthogonal to the optical axis of said lens;

wherein for each ball an interval of the regulating portions, where each of the regulating portions faces each other, is wider in the two directions orthogonal to the optical axis of said lens than the interval r+b, wherein r is the radius of the ball, and b is half of the maximum moving distance of said movable member.

30. An optical device comprising:

a lens;

a movable member that holds said lens, said movable member being movable in a direction orthogonal to an optical axis of said lens;

a fixed member that regulates movement of said movable member in a direction of the optical axis of said lens;

a plurality of members placed between said movable member and said fixed member, each of said plurality of members being held in a range surrounded by a respective plurality of regulating portions fanned on said fixed member so as to roll and to allow relative movement between said movable member and said fixed member; an urging member that urges said movable member toward said fixed member; and a driving device that generates force for moving said movable member in the direction orthogonal to the optical axis of said lens;

wherein for each member an interval of the regulating portions, where each of the regulating portions faces each other, is wider in the direction orthogonal to the optical axis of said lens of said movable member than the interval r+b, wherein r is a rolling radius of the member, and b is half of the maximum moving distance of said movable member.

31. An optical device according to claim 30, wherein the range surrounded by said plurality of regulating portions is formed by said movable member.

32. An optical device comprising:

a lens;

a movable member that holds said lens, said movable member being movable in a direction orthogonal to an optical axis of said lens;

a fixed member that regulates movement of said movable member in a direction of the optical axis of said lens;

a plurality of rotating members placed between said movable member and said fixed member, each of said plurality of rotating members rotating without contacting portions other than contact faces of said movable member and said fixed member when said movable member is moving;

an urging member that urges said movable member toward said fixed member; and a driving device that generates force for moving said movable member in the direction orthogonal tote optical axis of said lens.

* * * * *

UNITED STATES PATENT AND TRADEMARK OFFICE
CERTIFICATE OF CORRECTION

PATENT NO. : 6,631,042 B2  Page 1 of 1
DATED : October 7, 2003
INVENTOR(S) : Kazuhiro Noguchi It is certified that error appears in the above-identified patent and that said Letters Patent is hereby corrected as shown below:

Column 17,
Line 65, "pardons," should read -- portions, --.
Line 67, "member" should read -- member; --.

Column 18,
Line 3, "forte" should read -- force --.
Line 27, "towed" should read -- formed --, and "mu" should read -- roll --.
Line 55, "at&t" should read -- of the --.

Column 19,
Line 4, "a direction" should read -- two directions --.
Line 38, "fanned" should read -- formed --.

Column 20,
Line 2, "member; an" should read -- member; ¶ an --.
Line 35, "tote" should read -- to the --.

Signed and Sealed this

Twentieth Day of January, 2004

JON W. DUDAS
*Acting Director of the United States Patent and Trademark Office*